United States Patent
Li et al.

(10) Patent No.: US 11,070,045 B1
(45) Date of Patent: Jul. 20, 2021

(54) ELECTRICAL PROTECTIVE DEVICE FOR LOW-VOLTAGE DIRECT CURRENT (LVDC) NETWORK

(71) Applicant: Hong Kong Applied Science and Technology Research Institute Company, Limited, Hong Kong (HK)

(72) Inventors: Xin Li, Hong Kong (HK); Kin Lap Wong, Hong Kong (HK); Tin Ho Li, Hong Kong (HK)

(73) Assignee: Hong Kong Applied Science and Technology Research Institute Company Limited, Hong Kong (HK)

( * ) Notice: Subject to any disclaimer, the term of this patent is extended or adjusted under 35 U.S.C. 154(b) by 0 days.

(21) Appl. No.: 16/901,266

(22) Filed: Jun. 15, 2020

(51) Int. Cl.
*H02H 3/00* (2006.01)
*H02H 1/00* (2006.01)

(52) U.S. Cl.
CPC ............ *H02H 3/00* (2013.01); *H02H 1/0007* (2013.01)

(58) Field of Classification Search
CPC .............................. H02H 3/00; H02H 1/0007
USPC .......................................................... 361/83
See application file for complete search history.

(56) References Cited

U.S. PATENT DOCUMENTS

| | | | |
|---|---|---|---|
| 6,075,684 A | 6/2000 | Duba et al. | |
| 6,643,112 B1 * | 11/2003 | Carton | H01H 9/54 218/3 |
| 8,891,209 B2 | 11/2014 | Hafner et al. | |
| 9,742,185 B2 | 8/2017 | Wang et al. | |
| 2012/0299393 A1 * | 11/2012 | Hafner | H01H 9/542 307/113 |
| 2014/0313628 A1 * | 10/2014 | Hafner | H01H 33/596 361/91.5 |
| 2015/0229121 A1 | 8/2015 | Davidson | |
| 2016/0322809 A1 * | 11/2016 | Wang | H02H 7/222 |

(Continued)

FOREIGN PATENT DOCUMENTS

| | | |
|---|---|---|
| CN | 102687221 B | 11/2015 |
| CN | 104137211 B | 1/2016 |

(Continued)

OTHER PUBLICATIONS

ISR and Written Opinion, PCT/CN2020/096774, dated Mar. 11, 2011.

*Primary Examiner* — Dharti H Patel
(74) *Attorney, Agent, or Firm* — Stuart T. Auvinen; gPatent LLC

(57) ABSTRACT

An Electrical Protective Device for Low-Voltage DC networks (EPDL) has a controller that on start-up first closes a mechanical relay in a ground line, waits a first delay, then closes a bipolar transistor to allow current to flow through a positive supply line, then turns on a Metal-Oxide-Semiconductor Field-Effect Transistor (MOSFET) connected in parallel with the bipolar transistor once an output voltage reaches a minimum target. The controller reverses the start-up order to open the MOSFET, bipolar transistor, and finally the relay when an over-voltage, input-power, or integrated-current fault is detected. The output current is integrated over time and compared to a threshold, allowing for capacitor charging or other temporary over-loads. When the output voltage dips below the minimum target, the MOSFET is turned off until the voltage recovers. If the voltage does not recover within a time period, the bipolar transistor and then the relay are turned off.

20 Claims, 15 Drawing Sheets

(56) References Cited

U.S. PATENT DOCUMENTS

2017/0256934 A1     9/2017   Kennedy et al.
2019/0334340 A1* 10/2019   Niehoff ............... H01H 33/596

FOREIGN PATENT DOCUMENTS

| CN | 104756339 | B  | 9/2017  |
| CN | 107482575 | A  | 12/2017 |
| CN | 109314004 | A  | 2/2019  |
| CN | 105609344 | B  | 6/2019  |
| CN | 106099841 | B  | 7/2019  |
| EP | 0945983   | A2 | 9/1999  |
| WO | WO 2014177874 | A2 | 11/2014 |

* cited by examiner

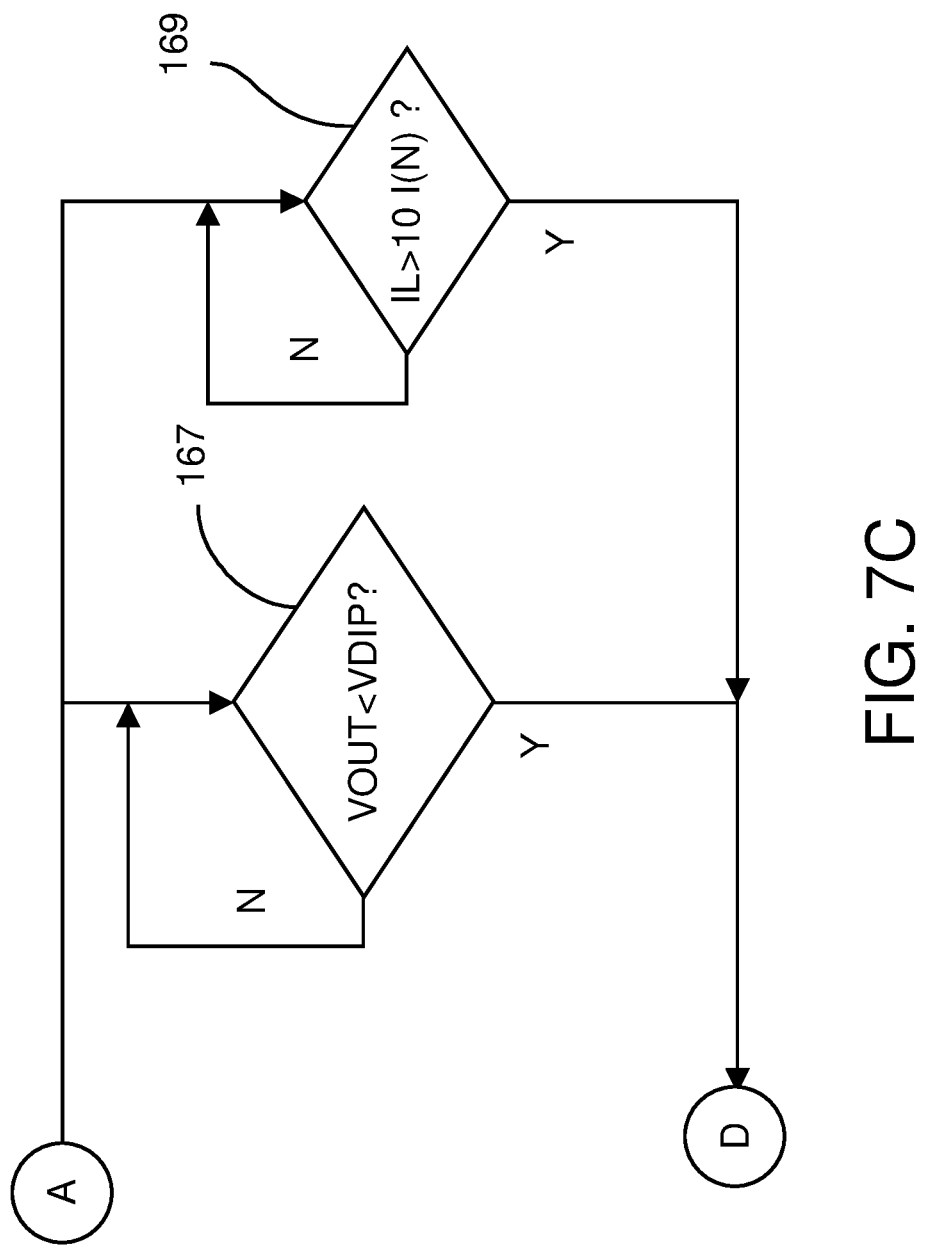

ELECTRICAL PROTECTIVE DEVICE FOR LOW-VOLTAGE DIRECT CURRENT (LVDC) NETWORK

FIELD OF THE INVENTION

This invention relates to circuit breakers, and more particularly to semiconductor electrical protective devices for DC networks.

BACKGROUND OF THE INVENTION

Direct Current (DC) networks are useful for powering DC devices, and can be found in battery storage systems, solar systems, electric vehicles, and DC networks in buildings and data centers. Similar to Alternating Current (AC) networks, circuit breakers are needed for DC networks to protect power sources, load, cables, and other components from damage when abnormal electric conditions occur, such as short circuit and overload.

Mechanical circuit breakers such as a Miniature Circuit Breaker (MCB) can be used to protect DC networks. However, these mechanical circuit breakers may take several milliseconds (ms) to open the circuit, but semiconductor-based power sources and loads can fail in microseconds (μs). The tiny semiconductor features can be destroyed a thousand times faster than the mechanical switch can act.

Since the DC grid lacks the zero-crossing of AC where breakers can be activated near the minimum current, serious arcing can occur. Also, DC systems tend to have a much lower inductance than do AC systems, so the current will increase very rapidly when shorts occur. Thus mechanical circuit breakers cannot provide the in-time protection for the power source and load in DC systems.

Rural electrification can be implemented using switch gear that follow standards such as to IEC/EN 60947-2:2016, which have breakers that are rated up to 1500 volts DC, for low-voltage power-distribution lines.

Such a low-voltage DC network can be protected by a Solid-State Circuit Breaker (SSCB), but these tend to have a very high cost since both poles are protected by a semiconductor switch. Miniature Circuit Breakers (MCB) are mechanical in nature and are less expensive than semiconductor switches but are much slower.

Hybrid Circuit Breakers (HCB) have both a solid-state switch and a mechanical relay in series. HCB's can have a faster disconnection than purely mechanical circuit breakers, but still have a relatively high cost.

What is desired is a semiconductor-based Electrical Protective Device for Low-Voltage DC networks (EPDL). An EPDL device with both semiconductor circuit breakers and a mechanical relay that protects both poles is desired. An EPDL device with a fast response time to provide in-time protection is desired.

BRIEF DESCRIPTION OF THE DRAWINGS

FIGS. 7A-7C is a flowchart of operation of the EPDL device.

DETAILED DESCRIPTION

The present invention relates to an improvement in DC semiconductor circuit breakers. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1A:
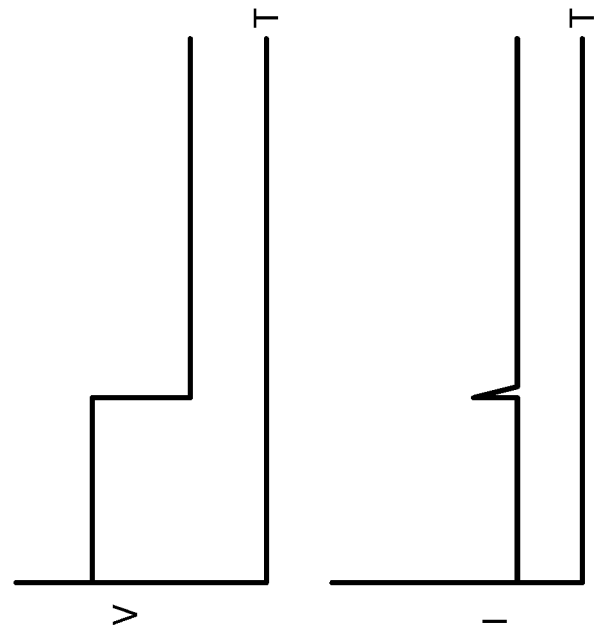
FIGS. 1A-1B show output current and voltage when a short circuit occurs.
Figure 1B:
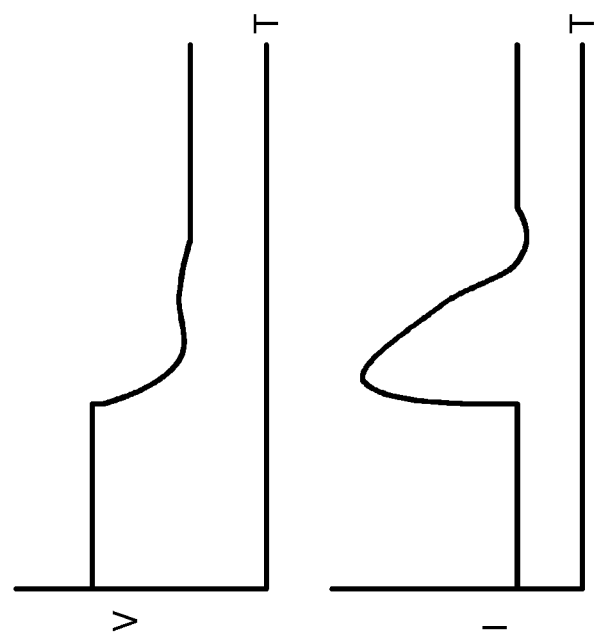

FIGS. 1A-1B show output current and voltage when a short circuit occurs. In FIG. 1A, a DC network is protected by a mechanical circuit breaker. The output voltage is 400 volts until the short circuit occurs. Then the terminal voltage falls over a period of about 1 ms. The output current jumps higher after the short occurs, and eventually falls and then settles down after more than 1 ms. The slow action of the mechanical circuit breaker allows the current surge due to the short since the mechanical circuit breaker is not able to respond in less than 1 ms.

In FIG. 1B, the DC network is protected by an Electrical Protective Device for Low-voltage DC networks (EPDL). The semiconductor breaker elements in the EPDL quickly disconnect the power in about 10 μs. The short-circuit current can only flow for a much shorter period of time. The parasitic inductive, capacitive, and resistive components in the DC loads are the same for FIGS. 1A and 1B. Since the EPDL of FIG. 1B responds in about 10 μs, while the mechanical circuit breaker of FIG. 1A responds in 1 ms, the peak current in FIG. 1A is about 3000 amps, while the peak current in FIG. 1B is less than 200 amps. While the peak current is 15 times smaller, the integral of the current curve, or energy dissipated, is about 100 times smaller. The reduced energy better protects DC devices from damage.

Figure 2:
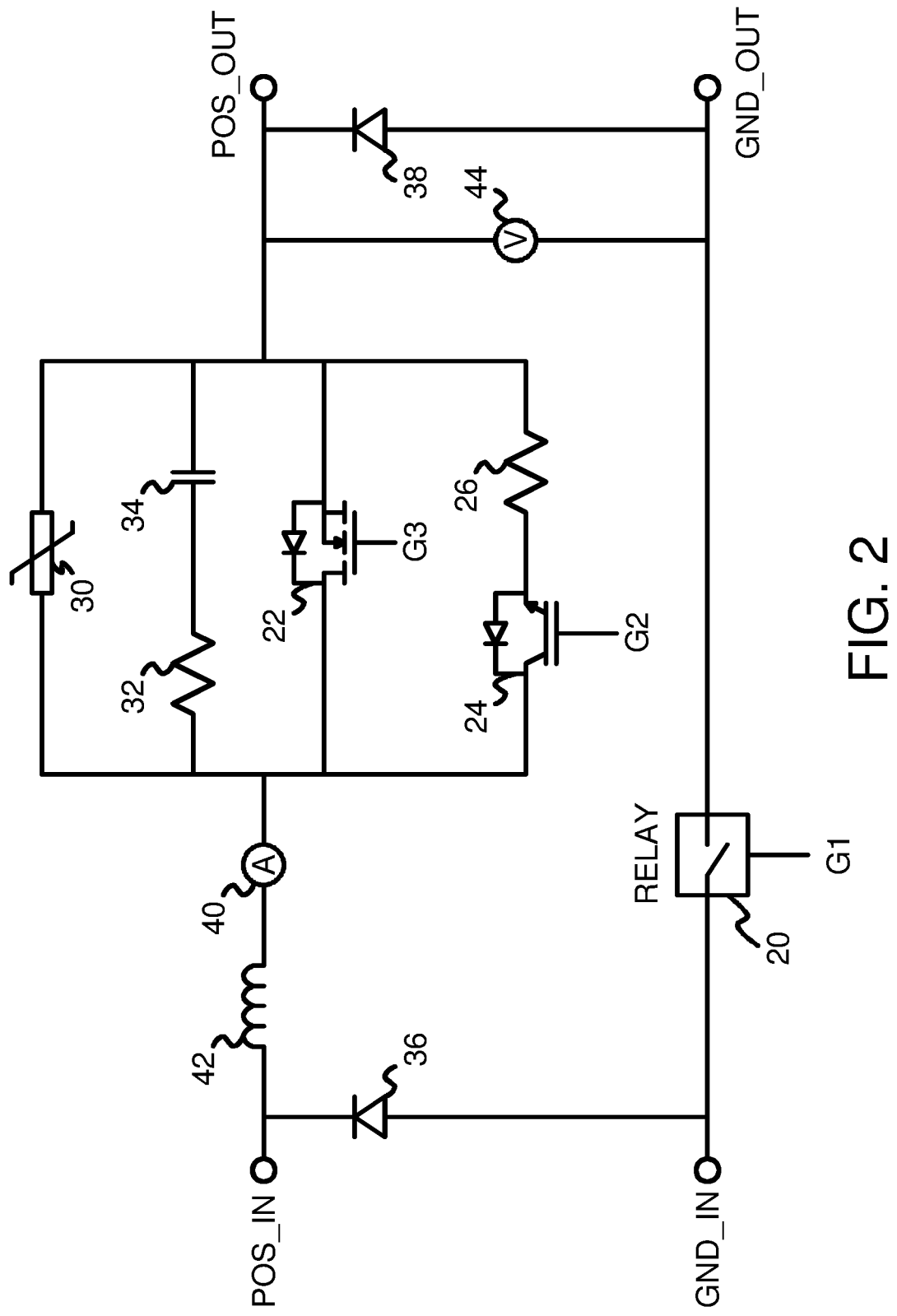
FIG. 2 is a diagram of an Electrical Protective Device for Low-voltage DC networks (EPDL).

FIG. 2 is a diagram of an Electrical Protective Device for Low-voltage DC networks (EPDL). Mechanical relay 20 disconnects the input ground GND_IN from the output ground GND_OUT to the DC network when gating signal G1 is in an inactive state, such as a low voltage. Mechanical relay 20 is relatively slow and can be an electromechanical relay with a moving plate that is pulled when an electromagnet is powered to open (or close) the relay contacts.

The power supply's positive terminal, POS_IN, is disconnected from the positive terminal, POS_OUT, to the DC network by semiconductor switches that include Metal-Oxide-Semiconductor Field-Effect Transistor (MOSFET) 22 and Insulated Gate Bipolar Transistor (IGBT) 24.

There are no mechanical switches between POS_IN and POS_OUT, only semiconductor switches. For the negative pole, between GND_IN and GND_OUT, there are no semiconductor switches, only a mechanical switch. Thus the positive pole has purely semiconductor switches, while the negative pole has purely mechanical switches. This provides a very quick disconnection of the positive pole, but a much slower disconnection of the negative pole. Having purely semiconductor switches in the positive pole, and purely mechanical switches in the negative pole allows for both poles to be disconnected, without the added cost of semiconductor switches in the negative pole.

Diode 36 turns on if the input polarity is reversed, with POS_IN being below GND_IN. Similarly, diode 38 turns on if the output polarity is reversed, with POS_OUT being below GND_OUT. Diodes 36, 38 offer protection for unusual current spikes such as can occur due to shorts.

Inductor 42 and current sensor 40 are in series with POS_IN. Inductor 42 resists sudden changes in input current, helping to filter input noise. The current from current sensor 40 is diverted into one of the three branches before the branches recombine to drive POS_OUT.

In the main branch, MOSFET 22 is switched off by gating signal G3. In the bypass branch, IGBT 24 is switched off by gating signal G2. IGBT 24 is in series with resistor 26 in the bypass branch. IGBT 24 can be an NPN bipolar transistor that receives G2 on its insulated gate (over its base) while MOSFET 22 can be an n-channel enhancement-type transistor that receives G3 on its gate.

The third branch is the protection branch. Varistor 30 can be a Metal-Oxide Varistor (MOV) with a non-linear variable resistance that provides suppression of voltage spikes and clamping. Varistor 30 is in parallel with resistor 32 and capacitor 34 to form a protection network. The resistance of varistor 30 can be very large at normal operating voltages. However, the resistance of varistor 30 is reduced when high voltages are applied. Thus varistor 30 provides clamping of large voltage spikes. The R and C values of resistor 32 and capacitor 34 can be set to a desired RC value to limit the voltage across sensitive components such as MOSFET 22 when MOSFET 22 and IGBT 24 are shut off.

The majority of the current passes through the main branch and MOSFET 22 during normal operations, since the MOSFET 22 can conduct with a low source-to-drain voltage while IGBT 24 in series with resistor 26 requires a larger voltage to conduct a given current. Varistor 30 requires a much higher voltage to conduct, so the third branch does not carry current during normal operation without large voltage spikes.

Voltage sensor 44 senses the output voltage on POS_OUT. The output voltage from voltage sensor 44 can be used to detect over-voltage and voltage dip conditions. Current sensor 40 can be used to detect other fault conditions, such as over-current.

Figure 3:
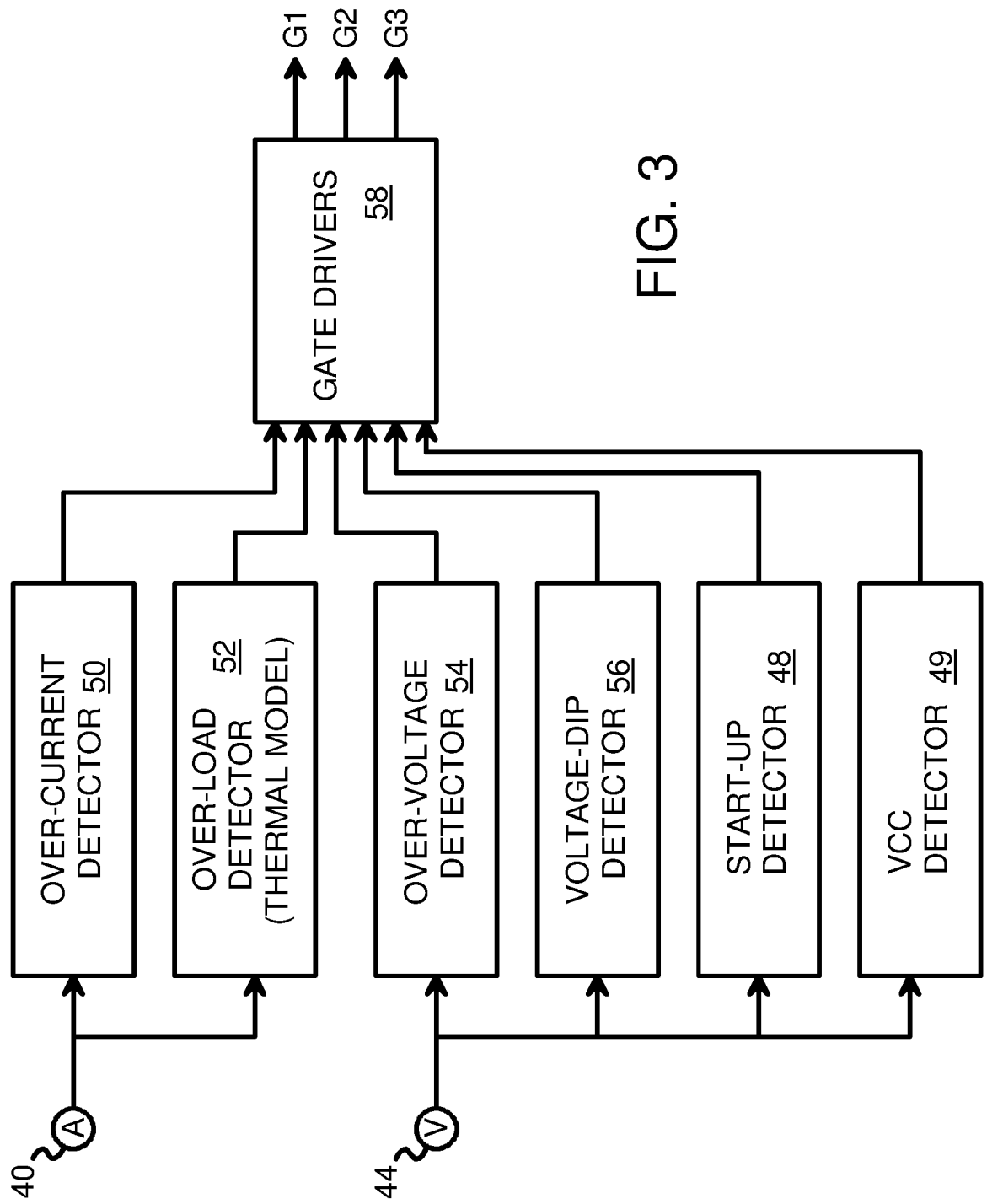
FIG. 3 shows EPDL fault identification functions and gate control.

FIG. 3 shows EPDL fault identification functions and gate control. The current through the positive terminal of the EPDL device of FIG. 2 is detected by current sensor 40, and the detected current value is compared to a threshold current by over-current detector 50 to detect over-current conditions. The detected current value is integrated over time by over-load detector 52 to detect thermal-modeled over-load conditions. Having two current over-load detectors allows for a higher instantaneous current limit for over-current detector 50 since lower currents that can cause damage by heating that occurs for a lower current over a period of time are detected by over-load detector 52.

The output voltage value detected by voltage sensor 44 is applied to over-voltage detector 54, voltage-dip detector 56, and start-up detector 48. Over-voltage detector 54 compares the detected voltage to a limit voltage to detect the over-voltage condition. Voltage-dip detector 56 compares the detected voltage to a target voltage to detect when the detected voltage dips below the target voltage. Start-up detector 48 compares the detected voltage to the target voltage and signals when the detected voltage has stayed above the target voltage for a sufficient period of time, indicating a successful start-up or initialization.

Gate drivers 58 receives outputs from over-current detector 50, over-load detector 52, over-voltage detector 54, voltage-dip detector 56, start-up detector 48, and Vcc detector 49 that indicate the various conditions being detected. A state machine or other sequence logic in gate drivers 58 determines when to open and close the switches in the EPDL device (FIG. 2). In particular, when relay 20 is a normally-open relay, first gate signal G1 is activated to close relay 20, second gate signal G2 is activated to close the channel in IGBT 24, and third gate signal G3 is activated to close the conducting channel in MOSFET 22.

When closing the EPDL breaker, when relay 20 is a normally-open relay, gate drivers 58 activates G1 first, to turn on relay 20, then after a delay activates G2 to turn on IGBT 24, and finally after another delay activates G3 to turn on MOSFET 22. The opposite sequence is followed when opening the EPDL breaker. Gate drivers 58 deactivates G3 first to quickly turn off MOSFET 22. Then, after a delay, gate drivers 58 deactivates G2 to turn off IGBT 24, and finally after another delay deactivates G1 to turn off relay 20. The slowest device, relay 20, is turned on first and turned off last. The fastest device, MOSFET 22, is turned on last and turned off first. This sequence keeps IGBT 24 on when MOSFET 22 is turning on or off, so that resistor 26 in series with IGBT 24 limits current and thus limits the voltage across MOSFET 22 to prevent damage to MOSFET 22.

Figure 4:
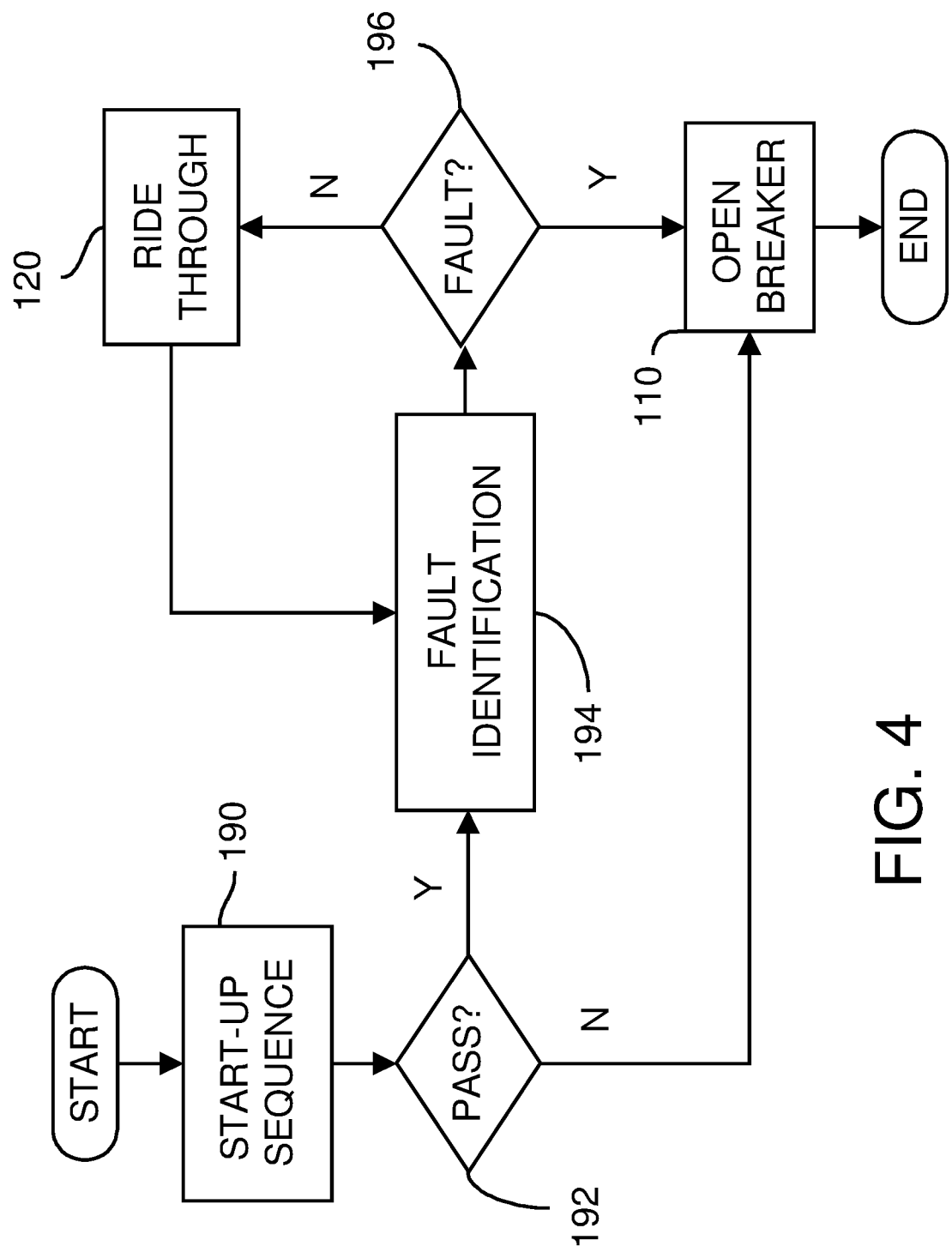
FIG. 4 highlights the overall control logic of the EPDL circuit breaker device of FIGS. 2-3.

FIG. 4 highlights the overall control logic of the EPDL circuit breaker device of FIGS. 2-3. When power is applied, start-up sequence 190 occurs to have gate drivers 58 turn on G1, G2, and G3, in that order, to turn on relay 20, IGBT 24, and finally MOSFET 22 once the target voltage is reached. If the target voltage is not reached during start up sequence 190, then the start-up sequence has failed, step 192, and the breakers are opened, step 110, by having gate drivers 58 deactivate G1, G2, and G3.

If the target voltage is reached during start up sequence 190, then the start-up sequence has passed, step 192, and the normal operation of the EPDL device occurs, with fault identification 194 checking for faults. The detected output voltage from voltage sensor 44 and the detected current from current sensor 40 are compared to various limits and targets to detect faults. When no faults are detected, step 196, normal operation continues. The EPDL device can ride through 120 short voltage dips or momentary current surges due to charging load capacitances. The EPDL device continues to check for faults using fault identification 194.

When a fault is detected, step 196, the breakers are opened, step 110, by having gate drivers 58 deactivate G1, G2, and G3.

Figure 5:
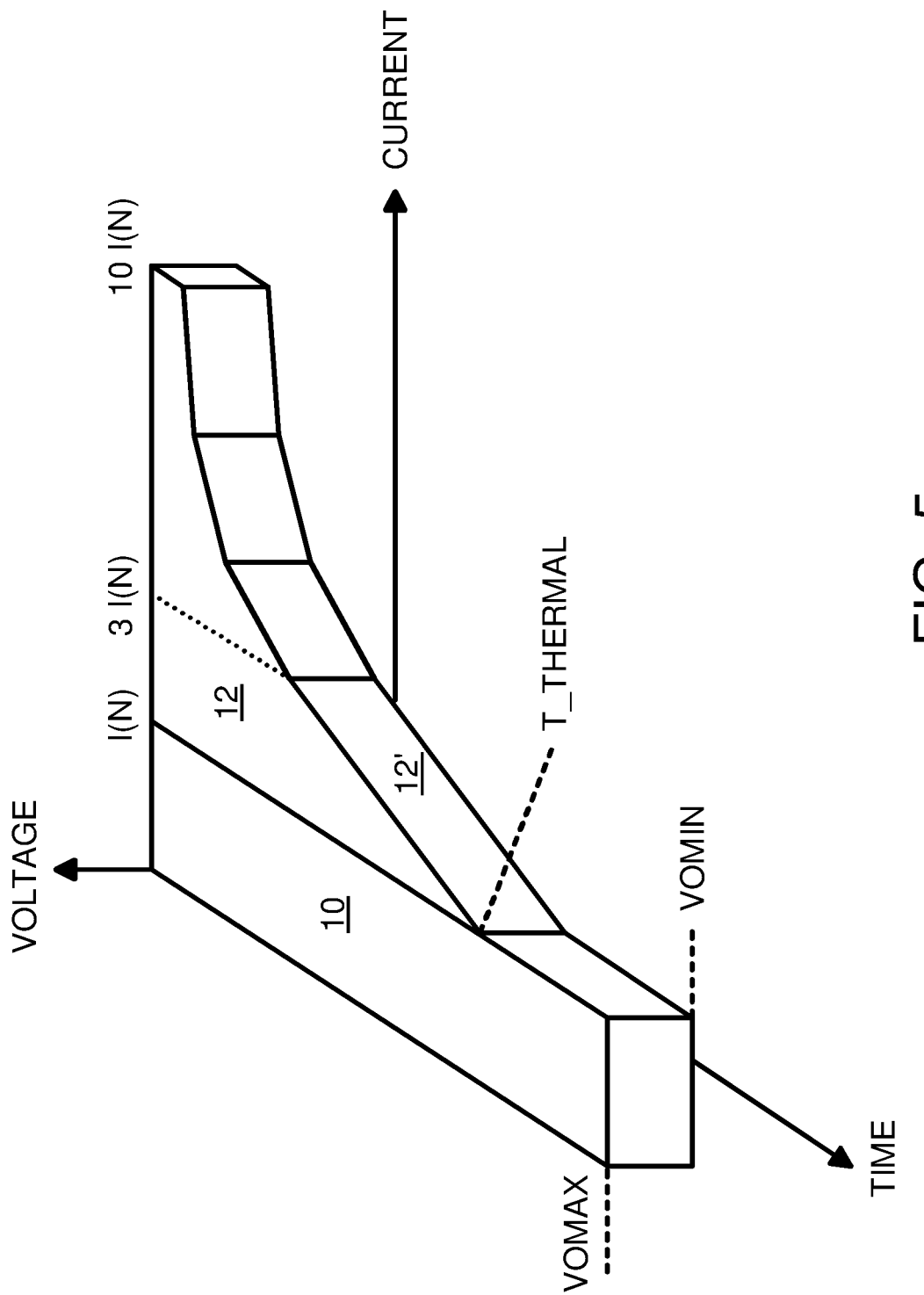
FIG. 5 is a 3-dimensional graph showing a normal operating range of current and voltage that is extended by integrating current over time.

FIG. 5 is a 3-dimensional graph showing a normal operating range of current and voltage that is extended by integrating current over time. The EPDL device has normal operating area 10 where the detected output voltage is less than a maximum limit VOMAX and above a minimum target voltage VOMIN. The output current is less than a nominal current value such as I(N) for normal operating area 10. The time value of normal operating area 10 can run from time zero to infinity, or whenever the EPDL device is turned off.

Occasionally, the output current can exceed the normal current value I(N), such as when a capacitive load is being charged, or when the load otherwise draws extra current as load components are switched on and off. Excess current can cause melting or other thermal damage to external components, such as the power source, load, cables, as well as to internal components such as MOSFET 22. This thermal damage is thought to be a function of the current over a period of time. When the output current exceeds the normal current value I(N) by a small amount, the time to thermal failure is T_THERMAL.

The thermal damage can be modeled as the output current integrated over time. Lower excess currents, for example 3×I(N), can be withstood for a longer period of time than higher currents, such as 10×I(N). Over-current region 12 has currents in excess of nominal current value I(N), but when these excess currents are integrated over time, the integral values are below a threshold. When the integrated currents over time exceed trigger surface 12', then a fault is triggered and the EPDL device is turned off.

Figure 6:
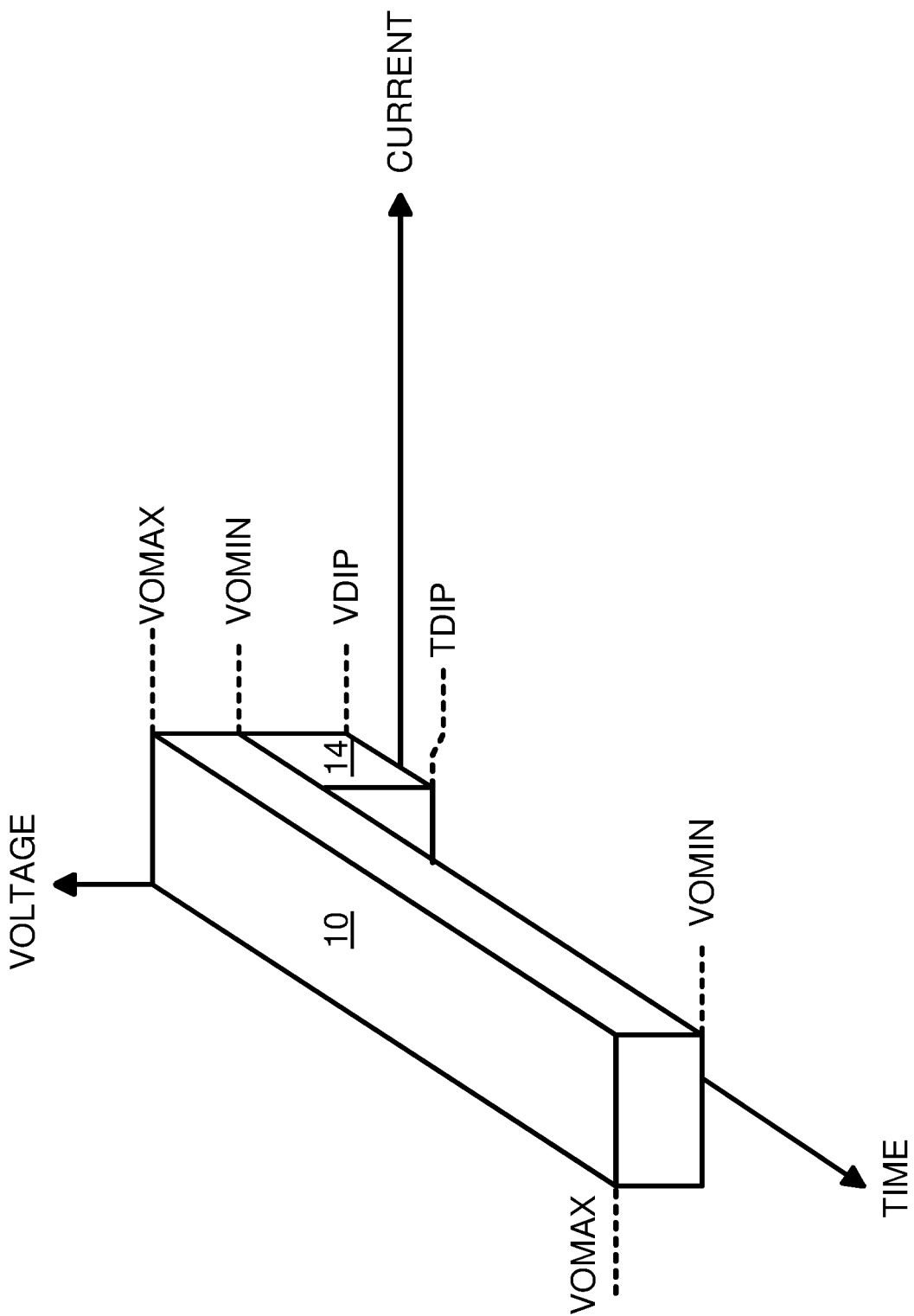
FIG. 6 is a 3-dimensional graph showing a normal operating range of current and voltage that is extended by a voltage dip region.

FIG. 6 is a 3-dimensional graph showing a normal operating range of current and voltage that is extended by a voltage dip region. Voltage dip region 14 is hidden from view in FIG. 5. Voltage dip region 14 is visible in FIG. 6 since over-current region 12 has been removed for better viewing. The actual EPDL has the graph of FIG. 5 where voltage dip region 14 is hidden from view. The actual EPDL has the features of both FIGS. 5 and 6 with all three regions 10, 12, 14.

The EPDL has normal operating area 10 where the detected output voltage is less than a maximum limit VOMAX and above a minimum target voltage VOMIN. The output current is less than a normal current value I(N) for normal operating area 10.

The output voltage may dip below minimum target voltage VOMIN for a short period of time, such as due to loading or charging capacitor loads. Output voltage dips can occur when an over-current occurs, or can occur without an over-current.

The EPDL remains on when the output voltage dips below minimum target voltage VOMIN, but not for longer than a dip time limit TDIP. Voltage dip region 14 can be limited by normal current value I(N), or could extend under a portion of over-current region 12 (FIG. 5). The lowest allowable voltage dip level VDIP can be specified, such as slightly above ground.

Figure 7A:
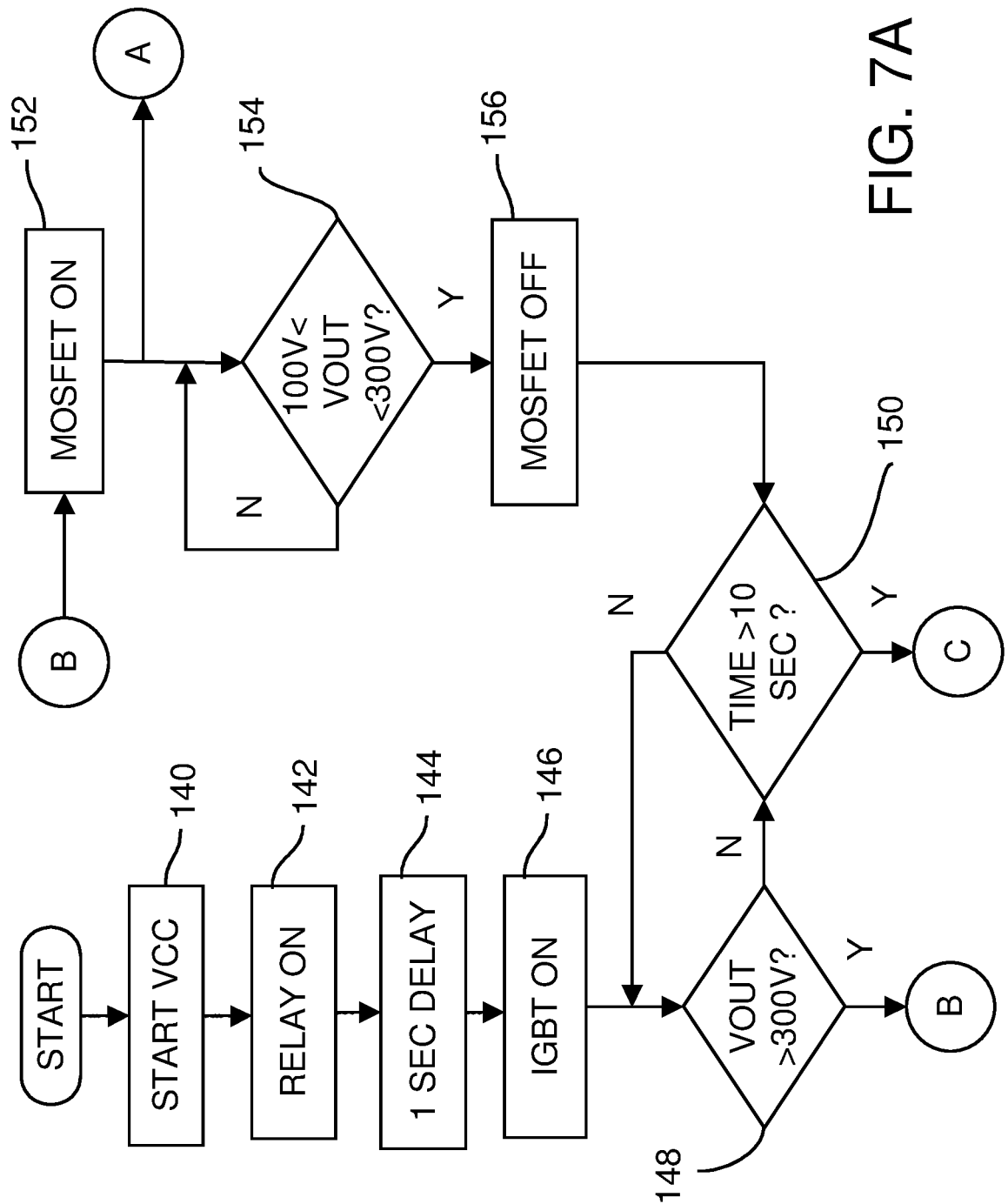
Figure 7B:
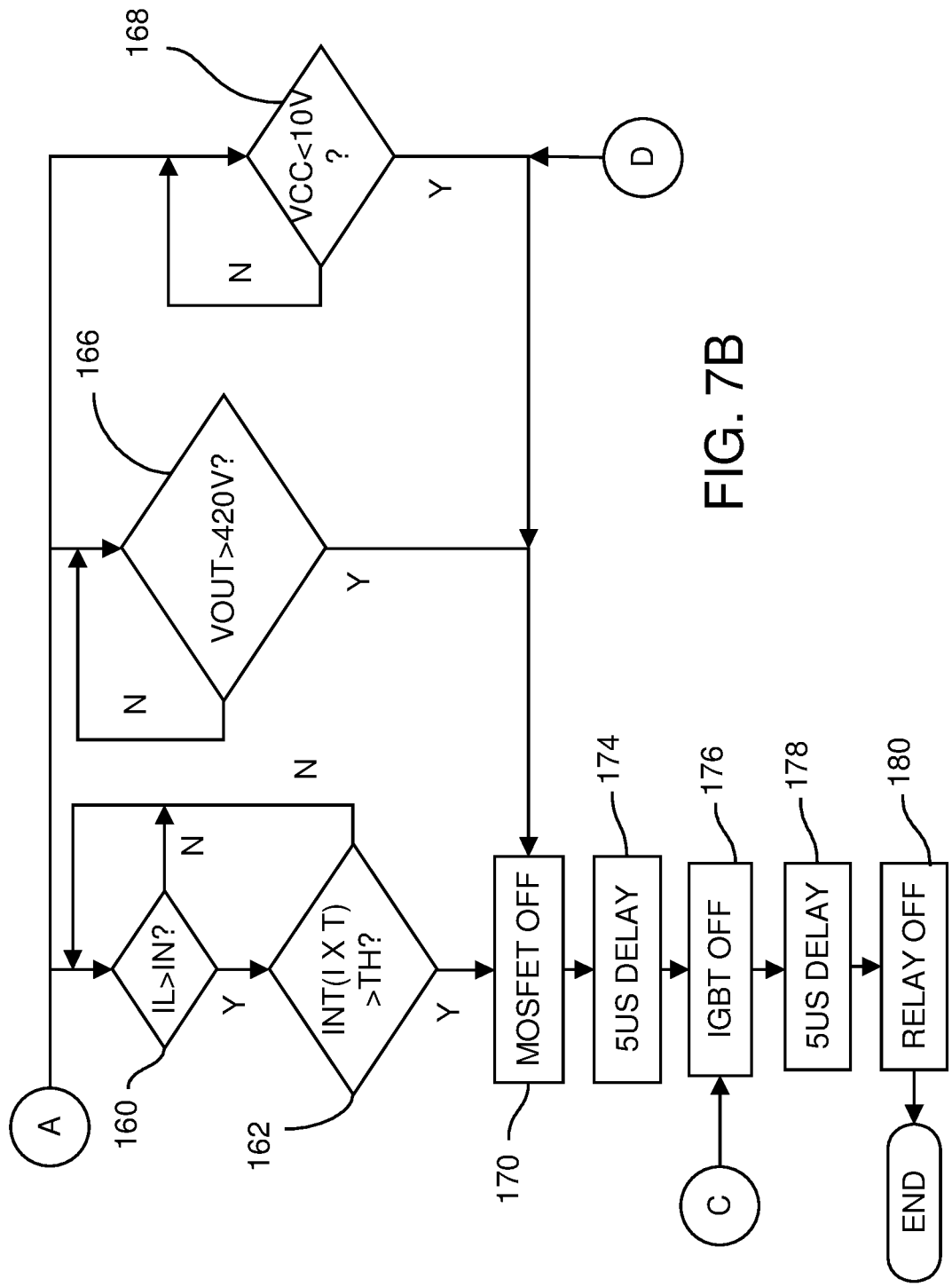

FIGS. 7A-7C is a flowchart of operation of the EPDL device. A start-up sequence begins when the power-supply voltage Vcc is applied to the EPDL device, step 140. Start-up detector 48 (FIG. 2) detects the presence of Vcc and causes gate drivers 58 to drive G1 high to turn on mechanical relay 20 (FIG. 3), step 142, for a normally-open relay type. A timer signals when 1 second has elapsed, step 144, and then gate drivers 58 drives G2 high to turn in IGBT 24, step 146. Mechanical relay 20 on connects ground, while IGBT 24 on connects POS_IN to POS_OUT, so a current loop is established, allowing the output voltage on POS_OUT to rise.

As the output voltage rises from ground toward the minimum target voltage, such as 300 volts, gate drivers 58 drives G3 high to turn in MOSFET 22. If the output voltage cannot reach the minimum target voltage, the output voltage is repeatedly compared to the target, step 148. This voltage comparison continues for up to a certain time, such as 10 seconds, step 150. Once the timer signals that 10 seconds has elapsed since Vcc activated the timer, step 150, then start-up has failed. There may be a short in the output load to POS_OUT, a failure of power source or an overload that prevents POS_OUT from rising to the target voltage. The process continues in FIG. 7B, step 176, where gate drivers 58 drives a low voltage to G2 to turn off IGBT 24. Then after a 5 µs delay, step 178, gate drivers 58 drive a low to G1, turning off mechanical relay 20, step 180. Thus MOSFET 22 is not turned on when a short, failure of power source, or an overload is detected at start-up.

Once the minimum target voltage (VOMIN in FIG. 5) is reached, such as 300 volts, step 148, then gate drivers 58 drive G3 high, turning on MOSFET 22, step 152. Mechanical relay 20 is turned on first, then after a delay, such as 1 second, to allow the slow mechanical relay to close and connect the grounds, IGBT 24 is turned on to connect the positive terminals POS_IN and POS_OUT. A current loop is formed through the power supply, the load, and IGBT 24 and mechanical relay 20. Then after the voltage reaches the 300V minimum target voltage, MOSFET 22 is turned on. MOSFET 22 has a very low ON resistance, while IGBT 24 requires a voltage drop to turn on its PN junction, so the main current flows through MOSFET 22, not through IGBT 24, during normal operation. MOSFET 22 provides a low-loss current path, improving efficiency of the EPDL.

Once MOSFET 22 has been turned on after a successful start-up, step 152 (FIG. 7A), then fault identification 194 (FIG. 4) is activated. Six branches are performed in parallel from step 152.

The first branch of fault identification, shown in FIG. 7A, is for voltage-dip detector 56 (FIG. 3). When the output voltage measured by voltage sensor 44 (FIG. 2) falls below the minimum target voltage but is still above a dip voltage (VDIP in FIG. 6), step 154, then MOSFET 22 is turned off, step 156. If the output voltage rises above the 300-volt minimum voltage target, step 148, then MOSFET 22 is turned on again, step 152. However, if the output voltage has not retaken the 300-voltage minimum target within a time period, such as 10 seconds, step 150, then IGBT 24 is turned off, step 176, and mechanical relay 20 is also turned off, step 180, after a 5 µs delay, step 178.

This first branch allows a voltage dip to occur that is less than the timer period TDIP, where the voltage is less than the minimum target voltage VOMIN, but still above a dip-minimum voltage VDIP. Voltage dip region 14 in FIG. 6 is below VOMIN but above VDIP, and for less time than TDIP. VOMIN can be 300 volts, TDIP can be 10 seconds, and VDIP can be 100 volts.

The second branch of fault detection, shown in FIG. 7B, is for over-load detector 52 using a thermal model. When the instantaneous load current IL measured by current sensor 40 (FIG. 2) is greater than the nominal current IN (FIG. 5 I(N)), step 160, then the load current is integrated over time, step 162, and the integral result INT(I×T) is compared to a threshold TH. Once the integral result is greater than the threshold, step 162, then MOSFET 22 is turned off, step 170. After a 5 µs delay, step 174, IGBT 24 is turned off, step 176. After a further 5 µs delay, step 178, mechanical relay 20 is turned off, step 180.

The integral can be calculated as a true integral, or can be an approximation, such as a Piece-Wise-Linear (PWL) calculator that adds the instantaneous current value to a running sum after each time period ΔT. Over-current region 12 of FIG. 5 shows where IL is more than I(N) and the integrated current is less than threshold TH. Surface 12' is where the integral of the current matches the threshold TH. Threshold TH can vary with the time period of the integral.

The third branch of fault detection is for over-voltage detector 54. When the output voltage measured by voltage sensor 44 exceeds a maximum target voltage such as 420 volts, step 166, then MOSFET 22 is turned off, step 170, and then IGBT 24 and mechanical relay 20 are turned, step 176, 180, off after 5 us delays, step 174, 178. In the graphs of FIGS. 5-6, this maximum target voltage is shown as VOMAX.

The fourth branch of fault detection detects power failure. When the Vcc power applied to the EPDL device is less than 10 volts, step 168, then MOSFET 22 is turned off, step 170, and then IGBT 24 and mechanical relay 20 are turned, step 176, 180, off after 5 us delays, step 174, 178. Vcc can be taken from POS_IN, or can be another power-supply voltage that powers control logic, processors, or other devices for FIGS. 3-4.

In FIG. 7C, when the instantaneous load current IL is much larger than the nominal current I(N), such as 10×I(N), step 169, then (FIG. 7B) MOSFET 22 is turned off, step 170. After a 5 μs delay, step 174, IGBT 24 is turned off, step 176. After a further 5 μs delay, step 178, mechanical relay 20 is turned off, step 180.

When the measured output voltage is less than VDIP, step 167, then the breaker is opened, FIG. 7B, starting with turning off MOSFET 22, step 170.

Figure 8:
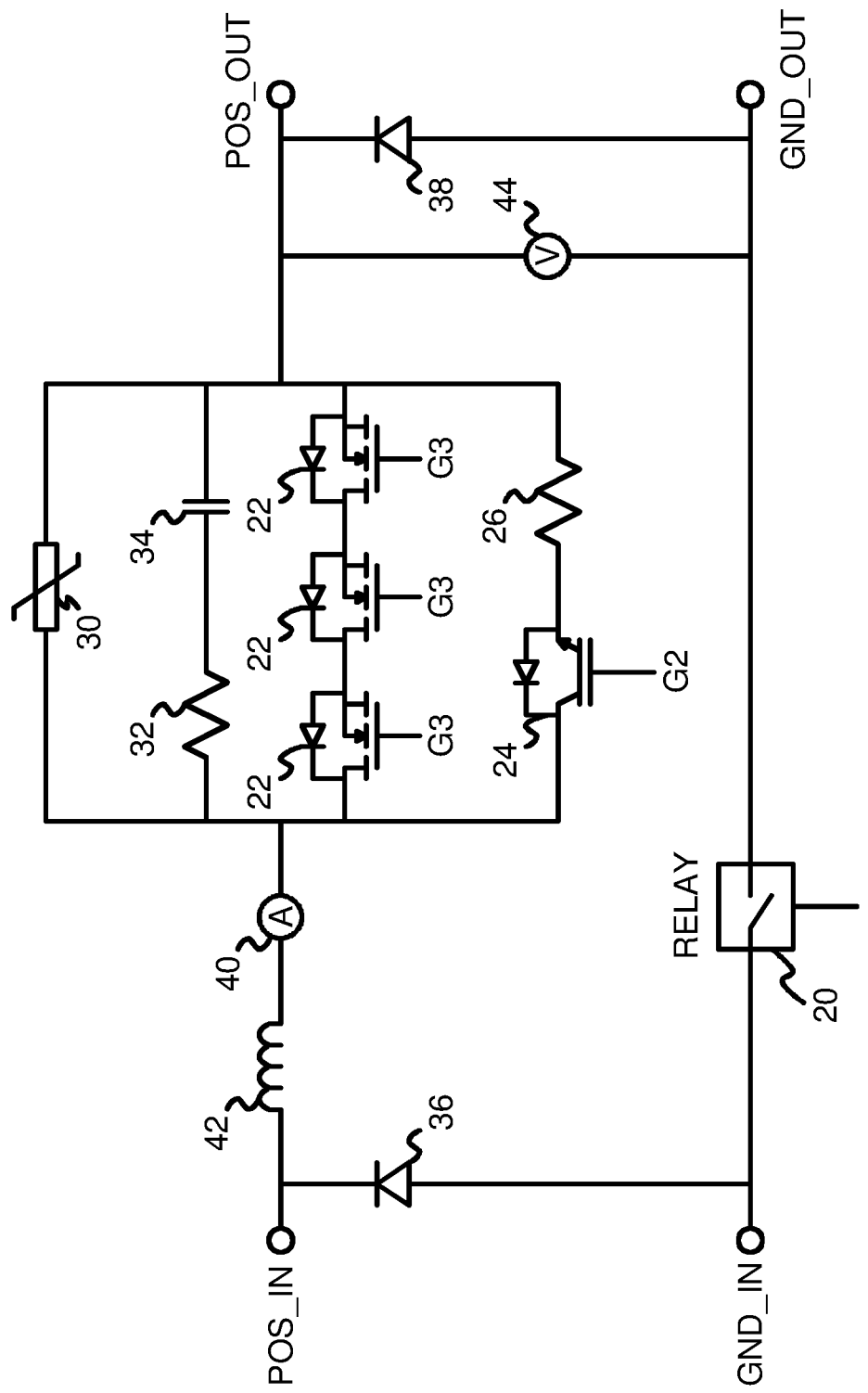
FIG. 8 is an alternative EPDL with a series of MOSFETs.

FIG. 8 is an alternative EPDL with a series of MOSFETs. Rather than have a single MOSFET 22 in the primary branch, there are three MOSFETs 22 in series in this example. When gate drivers 58 drive gate signal G3 high, all three of MOSFETs 22 turn on and conduct. Since the drain-to-source voltage of each of MOSFETs 22 is now one-third of that of the single IGBT 24 in FIG. 2, the series-connected MOSFETs 22 are less likely to breakdown and fail or be damaged. Reliability is increased.

Figure 9:
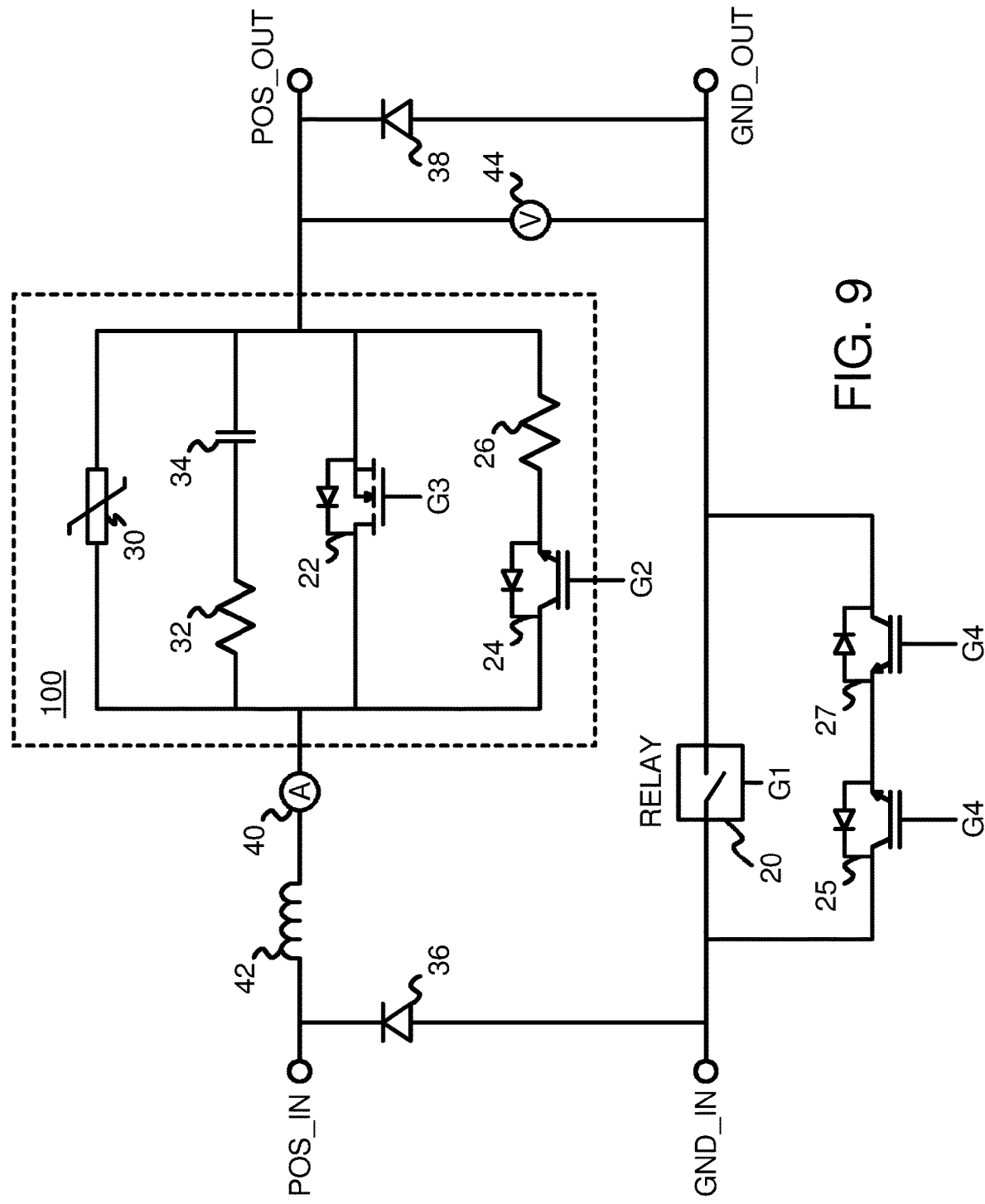
FIG. 9 is a bi-directional EPDL with IGBTs in parallel with the mechanical relay.

FIG. 9 is a bi-directional EPDL with an IGBT in parallel with the mechanical relay. Semiconductor switch 100 has MOSFET 22 and IGBT 24 in parallel with varistor 30 as described for FIG. 2. Ground-current IGBT 25, 27 are connected in series with each other and in parallel with mechanical relay 20 between GND_IN and GND_OUT. Ground-current IGBT 27 has its collector and emitter terminals reversed when compared to IGBT 24, and to IGBT 25. The insulated gates of ground-current IGBT 25, 27 are driven by gating signal G4, which can be the same as G2.

Figure 10:
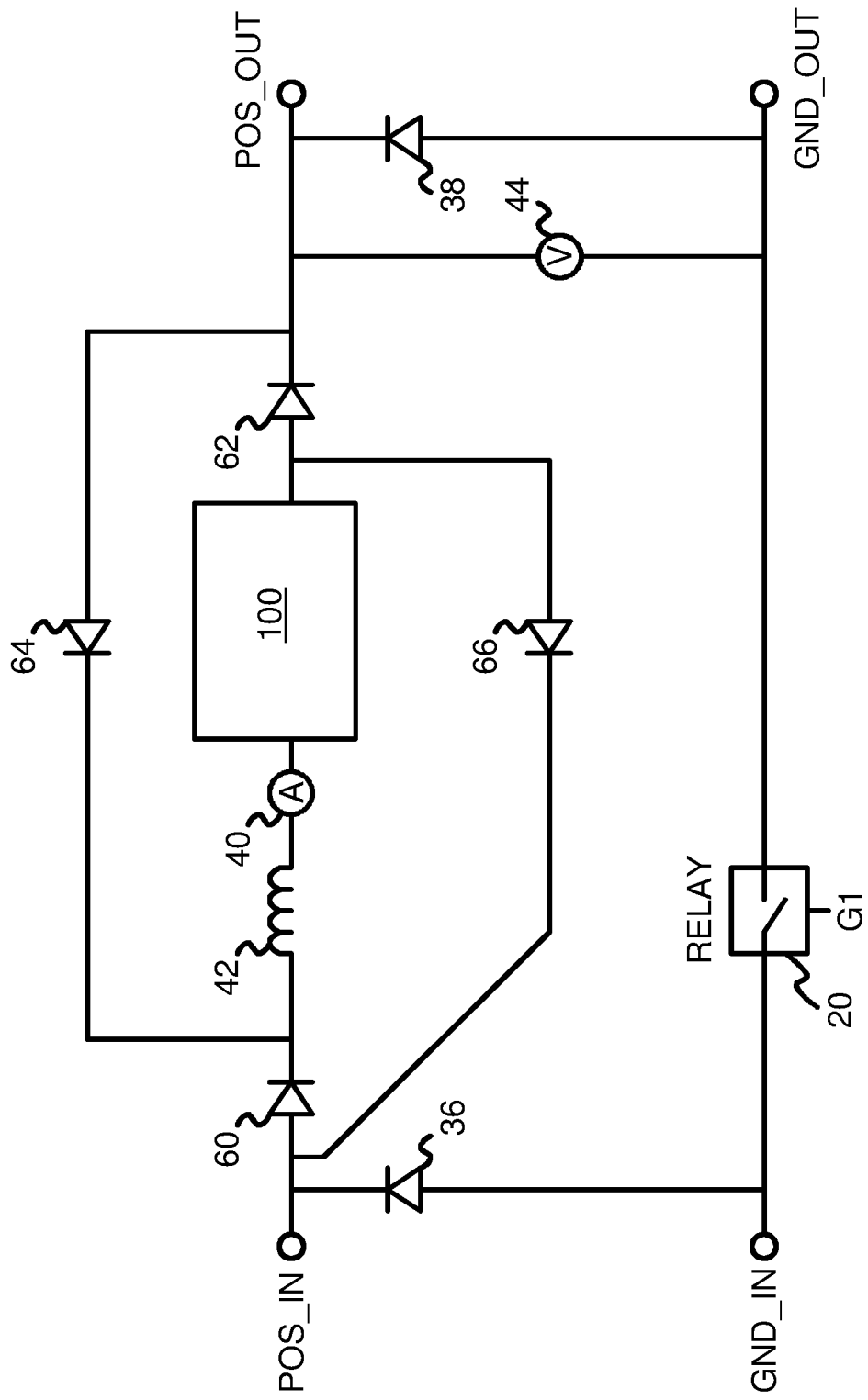
FIG. 10 is a bi-directional EPDL with a diode network protecting the semiconductor switch.

FIG. 10 is a bi-directional EPDL with a diode network. Semiconductor switch 100 has MOSFET 22 and IGBT 24 in parallel with varistor 30 as described for FIG. 2. Diodes 60, 62 ensure that current can only flow into the left side of semiconductor switch 100, through inductor 42 and current sensor 40 for forward current from POS_IN to POS_OUT. Diodes 64, 66 ensure that current can only flow from POS_OUT to POS_IN. Diodes 62, 64 act to allow reverse current from POS_OUT to bypass semiconductor switch 100 to POS_IN, for bi-directional current flow. Semiconductor switch 100 can be used to disconnect reverse current from POS_OUT, through diode 64, then through inductor 42 and current sensor 40, and semiconductor switch 100, then through diode 66 to POS_IN, since diodes 60, 62, 64, 66 act to route the reverse current through semiconductor switch 100 in the correct direction.

Current can flow backwards through the bi-directional EPDL of FIG. 10. When POS_OUT has a higher voltage than POS_IN, current from the load can flow from POS_OUT, through diode 64 to inductor 42 and current sensor 40 to the input of semiconductor switch 100, then from left to right through semiconductor switch 100, then through diode 66 to POS_IN. Diodes 60, 62 are reverse biased and prevent forward current flow.

Thus the addition of diodes 60, 62, 64, 66 allow semiconductor switch 100 to be used in both directions of current flow. This is useful to extend the EPDL to AC systems.

Figure 11:
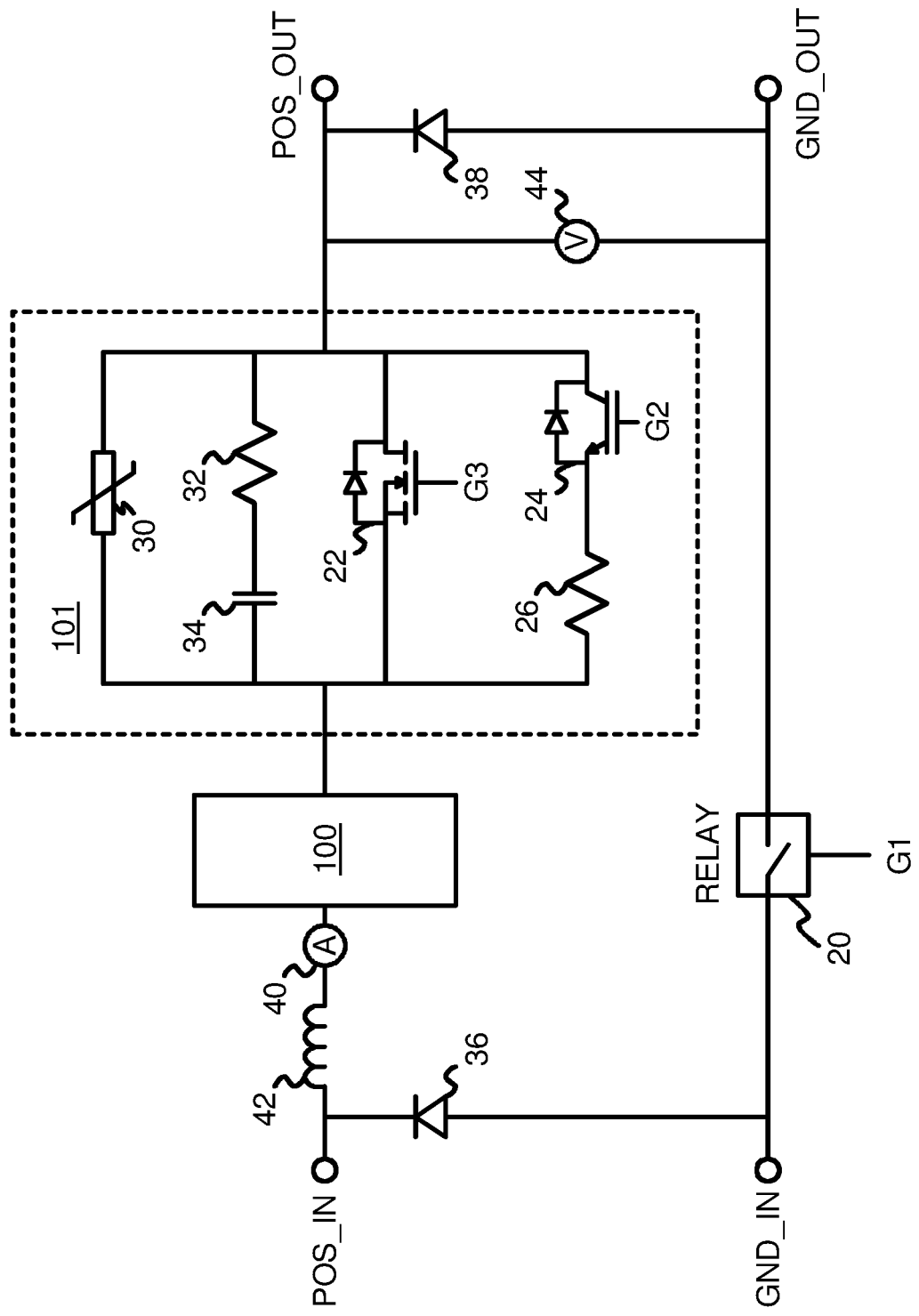
FIG. 11 is a bi-directional EPDL with two semiconductor switches in series.

FIG. 11 is a bi-directional EPDL with two semiconductor switches in series. Semiconductor switch 100 has MOSFET 22 and IGBT 24 in parallel with varistor 30 as described for FIG. 2. Semiconductor switch 101 is a mirror image of semiconductor switch 100. The same gate signal G2 is applied to the gates of MOSFET 22 in both of semiconductor switches 100, 101. Similarly, the gate signal G3 is applied to the insulated gates of IGBT 24 in both of semiconductor switches 100, 101. Reverse current from POS_OUT can flow through and be controlled by MOSFET 22 and IGBT 24 in semiconductor switch 101, and then through the body diodes of MOSFET 22 and IGBT 24 in semiconductor switch 100. Reverse current can be sourced from a capacitor being discharged in the load or can occur for an AC system.

Figure 12:
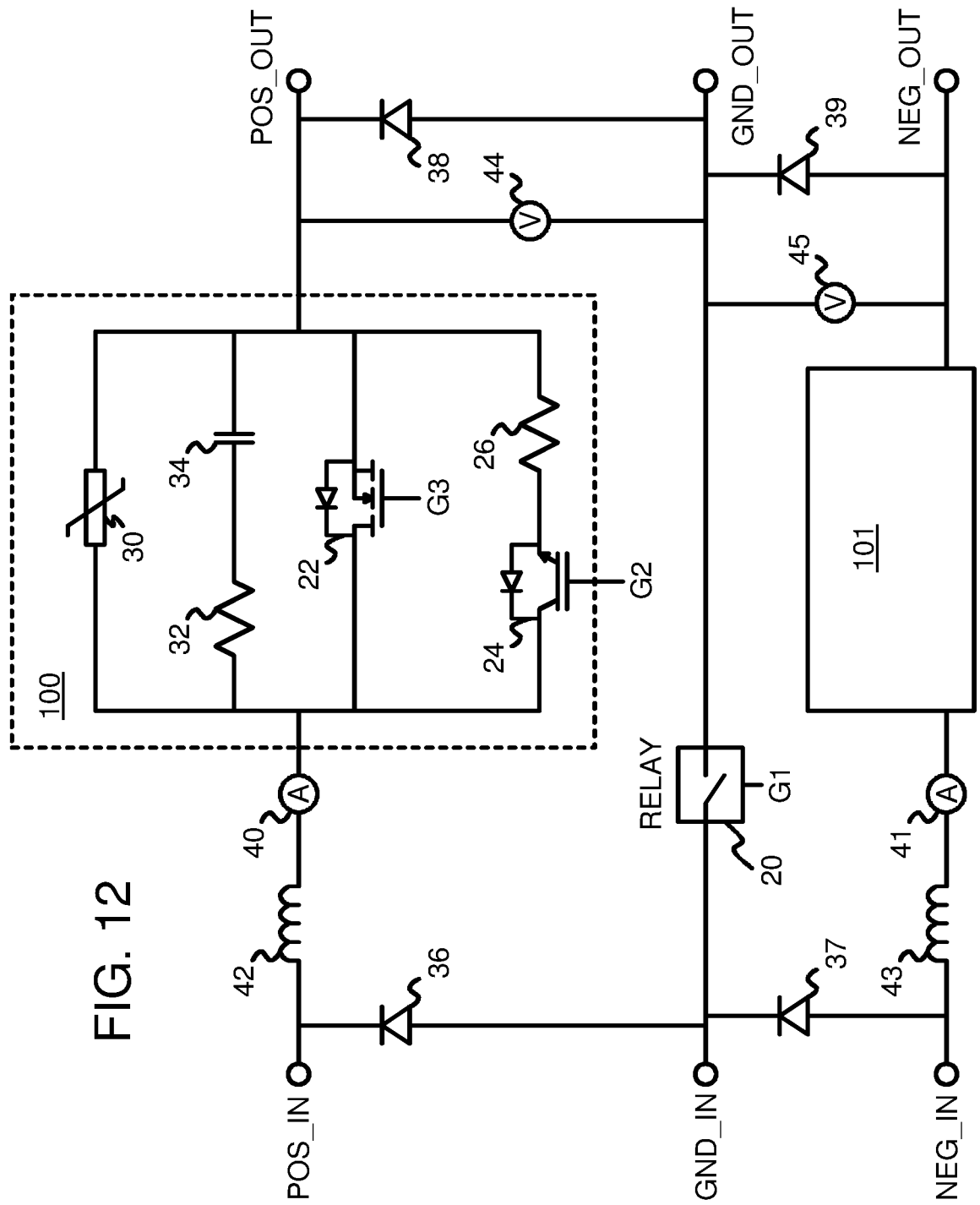
FIG. 12 is a 3-pole uni-directional EPDL with one semiconductor switch per pole.

FIG. 12 is a 3-pole uni-directional EPDL with one semiconductor switch per pole. Semiconductor switch 100 has MOSFET 22 and IGBT 24 in parallel with varistor 30 as described for FIG. 2. Semiconductor switch 101 is a mirror image of semiconductor switch 100. The same gate signals G2, G3 are applied to the gates of MOSFET 22 in both of semiconductor switches 100, 101.

Current in the positive-pole flows from POS_IN, through inductor 42 and current sensor 40 into semiconductor switch 100 and then is output to POS_OUT to drive the load between POS_OUT and GND_OUT. This current loop returns from the load on GND_OUT, then flows through mechanical relay 20 back to GND_IN and to the power supply to complete the current loop.

For reversed current, current in the ground line flows from GND_IN, then through mechanical relay 20, then to GND_OUT to drive the load between GND_OUT and NEG_OUT. This current loop returns into semiconductor switch 101 and through current sensor 40 and inductor 42 and back to NEG_IN and to the power supply to complete the current loop.

Figure 13:
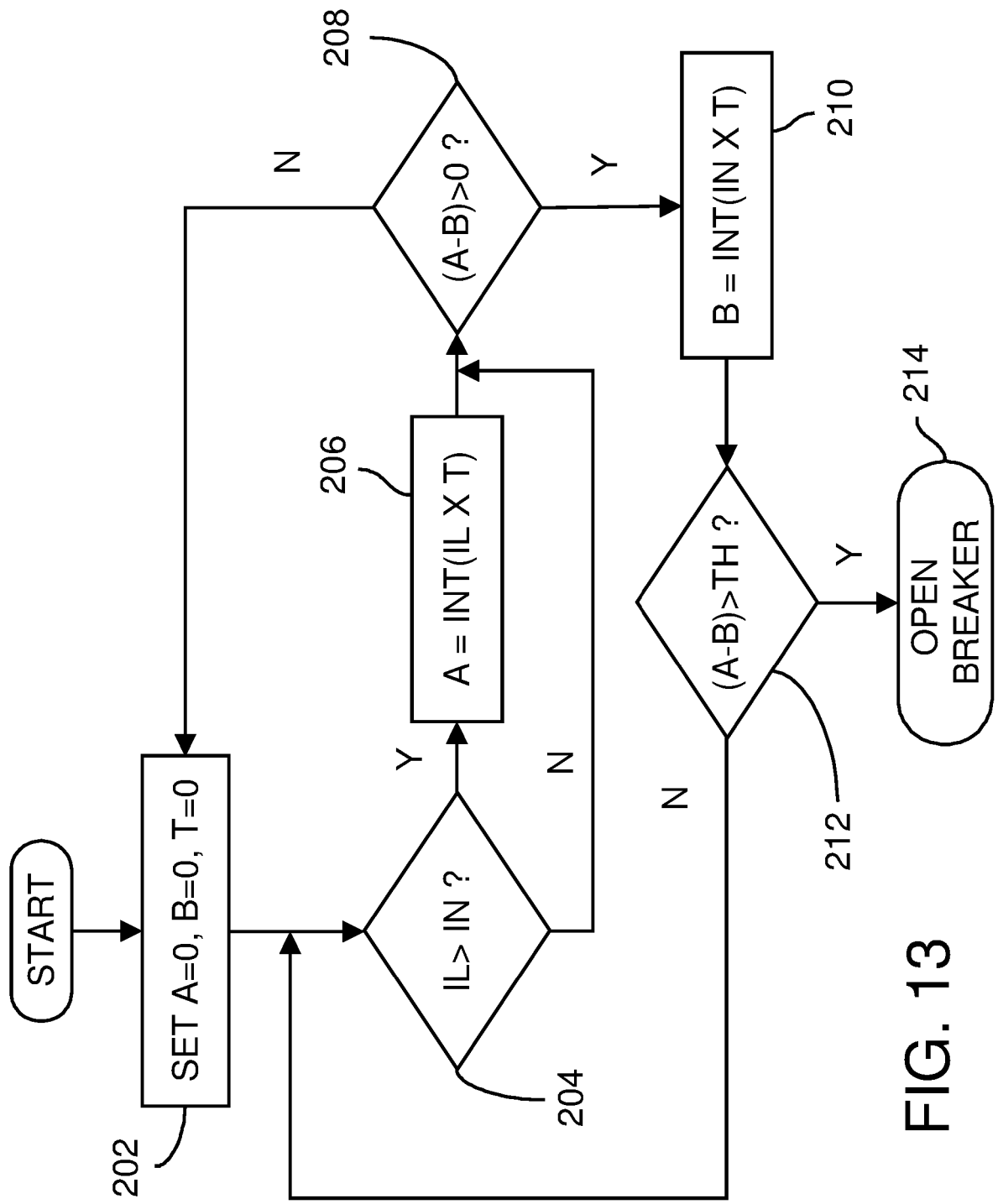
FIG. 13 is a flowchart showing fault detection using current integration.

FIG. 13 is a flowchart showing fault detection using current integration. Steps 160, 162 of FIG. 7B can be replaced by this more-detailed routine. After MOSFET 22 has been turned on, and fault detection is initiated, parameters A, B, and time T are reset, step 202. When the load current IL measured by current sensor 40 is more than the nominal current IN, step 204, then the measured current IL is integrated over time T, step 206. Normally A-B is greater than zero, step 208, and the expected nominal current IN is integrated over this same time period T, step 210. The integral of the nominal current, B, is subtracted from the integral of the measured current, A, and A-B is compared to the threshold TH, step 212. When the A-B exceeds threshold TH, then the breaker is opened, step 212, such as by following steps 170 to 180 in FIG. 7B.

When the integral difference A-B does not exceed threshold TH, step 210, then after a time delay, step 214, the measured load current IL is again compared to IN, step 204. When the load current is still high, step 204, then integral A is again computed, step 206, over a longer time period T. When the load current falls below IN, step 204, the prior integral of the load current, A, is retained and compared to the last value of B, step 208. A new value of B is calculated for the increased time period, step 210, and since B rises but A stays the same, A-B is reduced. If the measured current remains below IN, step 204, for several time periods, step 214, then eventually B will grow larger than or equal to A, and step 208 will activate step 202 to reset integration.

Alternate Embodiments

Several other embodiments are contemplated by the inventors. For example, more complex 3-pole EPDL's can be designed that are bi-directional rather than unidirectional. The unidirectional 3-pole EPDL of FIG. 12 can be extended to a 3-pole bi-directional EPDL by adding an additional semiconductor switch 101 in series with semiconductor switch 100 in the positive pole path between POS_IN and POS_OUT, as shown in FIG. 11, with an additional semiconductor switch 100 in series with the semiconductor switch 101 already shown between NEG_IN and NEG_OUT.

Another 3-pole bi-directional EPDL can be generated from FIG. 12 by adding two series-connected and mirrored ground-current IGBT 25 that are in parallel across mechanical relay 20. This is similar to FIG. 9, but there are two, not one, ground-current IGBT 25, and there is the negative pole as shown in FIG. 12.

Still another 3-pole bi-directional EPDL can be generated from FIG. 12 by adding diodes 60, 62, 64, 66 as shown in FIG. 10 around semiconductor switch 100 in the positive pole. Another set of four diodes 60, 62, 64, 66 are added around semiconductor switch 101 in the negative pole. Semiconductor switch 100 can be used in place of semiconductor switch 101 of FIG. 12 in the negative pole in this embodiment so that a mirrored semiconductor switch 101 is not needed.

While current sensor 40 and inductor 42 have been shown on the input of semiconductor switch 100, they could be moved to the output of semiconductor switch 100, or current sensor 40 could be located after semiconductor switch 100 and inductor 42 before semiconductor switch 100. More complex networks could be used for inductor 42, and also for varistor 30, resistor 32, and capacitor 34. Other kinds of variable resistors other than varistor 30 could be used to tune the RC network. The rating of varistor 30 could be fixed after prototypes are tested. Additional passive components could be added to the RC network.

Various kinds of faults can be detected, such as a current over-load with or without an output-voltage dip, an output voltage dip without a current over-load, a short circuit, an over-voltage of the output voltage, and various combinations. When the operating conditions move outside of normal operating area 10 (FIGS. 5-6), MOSFET 22 can be turned off immediately and quickly, except when the operating conditions move from normal operating area 10 into over-current region 12 or voltage dip region 14, where disconnection is delayed until the integrated current exceeds the threshold or after a period of time TDIP for a voltage dip. MOSFET 22 can be immediately disconnected when Voltage dip region 14 is entered, while IGBT 24 remains on until TDIP has elapsed. Thus a temporary voltage dip has only a reduction in current drive, a partial disconnection.

While delays of 5 μs are described for the delay between turn on/off of MOSFET 22 and IGBT 24, other delay values could be substituted. Likewise, the 1-second and 10-second delays and TDIP could be adjusted to other values. Voltage values could also be changed, such as the 300 and 420 volt values of VOMIN and VOMAX. The internal power-supply voltage Vcc could differ from POS_IN, or could be derived or divided-down from POS_IN. The value of nominal current value I(N) may be adjusted for different loads and environments.

Mechanical relay 20 can be an elctromechanical relay, such as a mono-polar contactor, part of a multi-pole relay, cryogenic contactors, a vacuum switch, Thompson coil actuator, DC contactor, normally-on or normally-off. While a normally-open relay has been described for mechanical relay 20, a normally-closed relay could also be used for mechanical relay 20. The polarity of gate signals, such as G1, may be reversed as needed. A normally-closed relay may still be considered to be activated by G1 to close and de-activated by G1 to open the relay, even though the default state of the relay is closed rather than open. The first gate signal to the relay may be a power signal to the relay that energizes the relay to close, for a normally-open relay, or open, for a normally-closed relay. For a normally-closed relay, the power signal applied to the relay may be considered to be an inverse of a positive gate signal G1, or an active-low gate signal G1.

Similarly, MOSFET 22 could be a depletion-mode transistor rather than an enhancement-mode transistor and have a normally-conducting state rather than a normally-isolated state. MOSFET 22 could be a p-channel device rather than an n-channel device. Likewise, PNP rather than NPN may be used for IGBT 24, with or without an insulated gate, or IGBT 24 may be replaced with a MOSFET or other semiconductor device.

More complex thermal models could be used than the simple current integrator described herein. Multiple thresholds could be used, or the threshold or delays could be re-programmed or selected based on the application, environment, or other characteristics. Values could be scaled or otherwise operated upon. Parameters such as delays and targets could be adjusted or scaled based on conditions such as device temperature or length of time between detected faults, or statistics or properties of the particular load being driven. For example, large loads with large capacitances could have a longer setting for the TDIP delay and a larger value of the threshold TH than do loads with smaller capacitances or with less switching of load capacitances. When the load uses a higher-frequency clock, TDIP and TH could be increased to allow for more capacitor charging.

Some kinds of faults could be disabled while others are enabled. Different applications or uses of the EPDL could have fault identification for some kinds of faults enabled, but fault identification for other kinds of faults disabled. Under-Voltage Lock-Out (UVLO) could be supported by providing a fault signal to downstream devices in the load that could disable themselves while the EPDL continues to operate.

Additional fault types could be identified. Some faults could activate a fault signal to controllers within the load circuitry, which could act on these fault signals such as by suspending, sleeping, slowing, or shutting down certain blocks within the load. The EPDL device might otherwise ignore these faults that are identified for use by external controllers. Fault signals could be sent to other blocks as electrical signals, could be encoded together, or could be sent wirelessly, such as by BlueTooth.

Control logic such as start-up detector 48, over-load detector 52, over-voltage detector 54, voltage-dip detector 56, over-current detector 50, and gate drivers 58 could be implemented in hardware, firmware, software, or combinations, such as programmable controllers. Delays could be generated by timers, dividers, or system clocks, system interrupts, command loops, etc.

While one MOSFET 22 (FIG. 2) or three MOSFETs 22 in series (FIG. 8) have been shown, a different number of MOSFETs 22 in series may be used, such as 2, 4, 8, 10, 16, etc. All of MOSFETs 22 in series could have the same size, or their sizes could be different, such as being tapered. Various featured and geometries could be used for MOSFET 22 and for IGBT 24, such as doughnut transistors, circular or ringed gates, multi-leg transistors, guard rings, etc.

In FIG. 9, a resistor could be added in series with the emitter of ground-current IGBT 25. Alternately, resistor 26 in series with the emitter of IGBT 24 could be removed, or parasitic resistances of IGBT 24 could suffice.

Inductor 42, current sensor 40, and semiconductor switch 100 are in series, or are series-connected. They may be connected together in series in any order, such as current sensor 40, inductor 42, semiconductor switch 100, or semiconductor switch 100, current sensor 40, inductor 42, or inductor 42, semiconductor switch 100, current sensor 40, or in any other order.

Additional components may be added at various nodes, such as resistors, capacitors, inductors, transistors, buffers, dividers, etc., and parasitic components may also be present. Enabling and disabling the circuit could be accomplished with additional transistors or in other ways. Pass-gate transistors or transmission gates could be added for isolation. Inversions may be added, or extra buffering. Separate power supplies and grounds may be used for some components. Various filters could be added. Active low rather than active high signals may be substituted.

Additional components may be added at various nodes for various purposes, such as cut-off switches for power-down modes, voltage shifters, offset currents to set operating points, etc. Various reference voltages or virtual supplies may be used rather than a hard ground.

The background of the invention section may contain background information about the problem or environment of the invention rather than describe prior art by others. Thus inclusion of material in the background section is not an admission of prior art by the Applicant.

Any methods or processes described herein are machine-implemented and are intended to be performed by machine, computer, or other device and are not intended to be performed solely by humans without such machine assistance. Tangible results generated may include reports or other machine-generated displays on display devices such as computer monitors, projection devices, audio-generating devices, and related media devices, and may include hardcopy printouts that are also machine-generated. Computer control of other machines is another tangible result.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A method for operating an Electrical Protective Device for Low-Voltage DC networks (EPDL) comprising:
   closing a mechanical relay between a ground input and a ground output when a power-supply voltage is initiated;
   after a first delay and a first gate signal is active, activating a second gate signal to enable a bipolar transistor to conduct current from a power input through a second current branch in a semiconductor switch to drive a load on a power output to generate an output voltage;
   detecting when a voltage sensor measures that the output voltage exceeds a minimum target and in response activating a third gate signal to enable a Metal-Oxide-Semiconductor Field-Effect Transistor (MOSFET) to conduct current through a first current branch in the semiconductor switch to the power output;
   when the voltage sensor does not measure that the output voltage exceeds the minimum target within a start-fault period of time, activating a first shut-down sequence by deactivating the second gate signal to disable the bipolar transistor from conducting current, and then after a second delay, deactivating the first gate signal to open the mechanical relay;
   detecting when the voltage sensor measures the output voltage below the minimum target after the MOSFET has been enabled, and deactivating the third gate signal to disable the MOSFET and re-activating the third gate signal to re-enable the MOSFET when the voltage sensor again measures the output voltage above the minimum target, or activating the first shut-down sequence after a third period of time when the voltage sensor does not measure the output voltage above the minimum target within the third period of time; and
   detecting when the voltage sensor measures that the output voltage exceeds a maximum target and in response activating a second shut-down sequence by deactivating the third gate signal to disable the MOSFET from conducting current, and then after a third delay, activating the first shut-down sequence to disable the bipolar transistor and then the mechanical relay.

2. The method of claim 1 further comprising:
   detecting when a current sensor in series with the semiconductor switch detects a current value that exceeds a target current value;
   wherein the current sensor generates a series of current values for different time values;
   initiating a current integrator to integrate the current values over the time values to generate an integrated current value;
   generating an integrated threshold that varies with the different time values;
   comparing the integrated current value to the integrated threshold and signaling an over-load fault when the integrated current value exceeds the integrated threshold; and activating the second shut-down sequence when the overload fault is signaled.

3. The method of claim 2 wherein the first delay is at least 10,000 times longer than the second delay or the third delay.

4. A Direct Current (DC) Electrical Protective Device comprising:
a relay connected between a ground input from a power supply and a ground output to a load, the relay being an electromechanical relay responsive to a first gate signal;
an inductor, a current sensor, and a semiconductor switch connected in series between a power input from the power supply and a power output to the load;
wherein the semiconductor switch further comprises:
a bypass branch having a bipolar transistor that is switched on and off by a second gate signal;
a main branch having a Metal-Oxide-Semiconductor Field-Effect Transistor (MOSFET) having a gate controlled by a third gate signal;
a passive branch having a passive network of a resistor and a capacitor;
wherein the main branch, the bypass branch, and the passive branch are connected in parallel with each other;
a voltage sensor that measures an output voltage between the power output and the ground output; and
gate drivers for generating a start-up sequence and for generating a shut-down sequence that is activated by faults;
wherein the start-up sequence activates the first, second, and third gate signals in that order with a delay between each activation, so that the relay is activated first, then the bipolar transistor after a delay, and then the MOSFET after another delay;
wherein the shut-down sequence deactivates the third, second, and first gate signals in that order with a delay between each deactivation, so that the MOSFET is deactivated first, then the bipolar transistor after a delay, and then the relay after another delay.

5. The DC Electrical Protective Device of claim 4 further comprising:
an over-voltage detector that generates an over-voltage fault to the gate drivers to initiate the shut-down sequence when the voltage sensor measures the output voltage as above a maximum target voltage.

6. The DC Electrical Protective Device of claim 5 further comprising:
a current integrator that integrates over time an output current measured by the current sensor to generate an integrated current value;
an over-load detector that activates the current integrator to begin integrating the output current when the output current exceeds a current target, the over-load detector generating an over-load fault when the integrated current value exceeds a threshold;
wherein the gate drivers initiate the shut-down sequence when the over-load fault is detected;
whereby output currents that exceed the current target are permitted when the integrated current value does not yet exceed the threshold, whereby temporary current surges to charge load capacitances are permitted and do not activated the shut-down sequence.

7. The DC Electrical Protective Device of claim 6 further comprising:

a voltage-dip detector that generates a voltage-dip fault when the voltage sensor measures the output voltage below a minimum target voltage and above a dip-minimum voltage;
wherein the gate drivers deactivate the third gate signal to disable the MOSFET in response to the voltage-dip fault, the gate drivers re-activating the third gate signal when the output voltage again rises above the minimum target voltage, the gate drivers continuing the shut-down sequence when the output voltage stays below the minimum target voltage for more than a voltage dip period of time;
whereby the MOSFET is shut off temporarily for a temporary voltage dip.

8. The DC Electrical Protective Device of claim 7 further comprising:
a power failure detector that activates a power failure fault that causes the gate drivers to activate the shut-down sequence when a power-supply voltage falls below a minimum power voltage.

9. The DC Electrical Protective Device of claim 8 further comprising:
a start-up detector that activates a start-up fault that causes the gate drivers to activate the shut-down sequence when the output voltage has not reached the minimum target voltage within a period of time.

10. The DC Electrical Protective Device of claim 7 wherein the start-up sequence comprises, in order:
activating the first gate signal to close the relay;
waiting a first delay;
activating the second gate signal to enable the bipolar transistor to conduct current;
when the voltage sensor measures that the output voltage has reached or exceeded a minimum target voltage, activating the third gate signal to enable the MOSFET to conduct current.

11. The DC Electrical Protective Device of claim 10 wherein the shut-down sequence further comprises, in order:
deactivating the third gate signal to disable the MOSFET from conducting current;
waiting a second delay;
deactivating the second gate signal to disable the bipolar transistor from conducting current;
waiting the second delay;
deactivating the first gate signal to open the relay.

12. The DC Electrical Protective Device of claim 7 wherein the bipolar transistor is an Insulated Gate Bipolar Transistor (IGBT) having an insulated gate over a base, wherein the insulated gate receives the second gate signal.

13. The DC Electrical Protective Device of claim 12 further comprising:
a resistor in series with the bipolar transistor.

14. The DC Electrical Protective Device of claim 7 wherein the MOSFET comprises a plurality of MOSFETs in series.

15. The DC Electrical Protective Device of claim 7 wherein the passive branch further comprises:
a varistor in parallel with the resistor and the capacitor;
wherein the resistor and the capacitor are connected in series with each other, wherein the varistor clamps the passive network.

16. The DC Electrical Protective Device of claim 7 further comprising:
a mirror of the semiconductor switch that is connected in series with the semiconductor switch, the inductor, and the current sensor;

whereby current can flow in either direction through the mirror of the semiconductor switch, the semiconductor switch, the inductor, and the current sensor, that are connected in series.

17. The DC Electrical Protective Device of claim 7 wherein the power supply is a 3-pole power supply and the load is a 3-pole load;
further comprising:
a negative pole input from the power supply;
a negative pole output to the load; and
a mirror of the semiconductor switch that is connected in series with a second inductor and a second current sensor, between the negative pole input and the negative pole output.

18. The DC Electrical Protective Device of claim 7 further comprising:
a first diode connected to conduct from the power input to a series input;
wherein the series input is an input to the inductor, current sensor, and semiconductor switch that are connected in series, and has a series output;
a first feedback diode connected to conduct from the power output to the series input;
a second diode connected to conduct from the series output to the power output;
a second feedback diode connected to conduct from the series output to the power input;
wherein the Direct Current (DC) Electrical Protective Device is bi-directional.

19. An Electrical Protective Device for Low-Voltage DC networks (EPDL) comprising:
a mechanical relay connected between a ground input and a ground output and controlled by a first gate signal;
a current sensor;
an inductor;
a semiconductor switch coupled in series with the current sensor and with the inductor to switch current between a power input and a power output;
an Insulated Gate Bipolar Transistor (IGBT) in series with a resistor in a second branch between an input and an output of the semiconductor switch, the IGBT having a control gate that is controlled by a second gate signal;
a Metal-Oxide-Semiconductor Field-Effect Transistor (MOSFET) having a gate controlled by a third gate signal, the MOSFET in a first branch in the semiconductor switch, the MOSFET coupled between the input and the output of the semiconductor switch;
a resistor and capacitor network coupled between the input and the output of the semiconductor switch in a third branch;
a current integrator for integrating over a period of time a current measured by the current sensor to generate an integrated current;
an over-load detector that activates the current integrator to begin integrating current when a current measured by the current sensor exceeds a target current, and that generates an over-load fault signal when the integrated current exceeds a threshold;
a voltage sensor that measures an output voltage of the power output;
a voltage-dip detector that activates a voltage-dip signal when the output voltage falls below a target voltage and that deactivates the voltage-dip signal when the output voltage raises above the target voltage;
a gate driver controller that disables the MOSFET by disabling the third gate signal when the voltage-dip signal is activated, and that re-enables the MOSFET by enabling the third gate signal when the voltage-dip signal is deactivated; and
a shut-down sequencer that activates the gate driver controller to deactivate the second gate signal to disable the IGBT from conducting current, and after waiting a third delay, deactivating the first gate signal to open the mechanical relay;
wherein the shut-down sequencer is activated by the voltage-dip detector when the output remains below the target voltage for more than a dip period of time.

20. The EPDL of claim 19 further comprising:
a full shut-down sequencer that activates the gate driver controller to deactivate the third gate signal to disable the MOSFET from conducting current, and after waiting a second delay, activates the shut-down sequencer to deactivate the second gate signal to disable the IGBT from conducting current and to deactivate the first gate signal to open the mechanical relay;
an over-voltage detector that activates the full shut-down sequencer when the voltage sensor detects that the output voltage exceeds a maximum target voltage.

* * * * *